United States Patent [19]

Springer

[11] Patent Number: 4,465,946
[45] Date of Patent: Aug. 14, 1984

[54] INTERLOCKING FRAME ASSEMBLY FOR AN ELECTRIC MOTOR STATOR

[75] Inventor: H. Robert Springer, St. Louis, Mo.

[73] Assignee: Century Electric, Inc., St. Louis, Mo.

[21] Appl. No.: 525,137

[22] Filed: Aug. 22, 1983

Related U.S. Application Data

[63] Continuation of Ser. No. 291,467, Aug. 10, 1981, abandoned.

[51] Int. Cl.³ .............................................. H02K 5/18
[52] U.S. Cl. ......................................... 310/42; 310/89
[58] Field of Search ...................... 310/42, 64, 85, 88, 310/89, 91

[56] References Cited

U.S. PATENT DOCUMENTS 3,916,231 10/1975 Cathey .............................. 310/89 X

FOREIGN PATENT DOCUMENTS 1538993 10/1969 Fed. Rep. of Germany ........ 310/89
45-30547 3/1970 Japan ..................................... 310/89
1217992 1/1971 United Kingdom ................... 310/89

Primary Examiner—John Gonzales
Attorney, Agent, or Firm—Rogers, Eilers & Howell

[57] ABSTRACT

A frame assembly for an electric motor stator is described. The frame includes at least three arcuate units for encircling a wound core of an electric motor stator. The assembly further includes a means for interlockingly engaging the arcuate units so that the units may be maintained about the stator prior to welding. The interlocking means extends from at least one end of each arcuate unit. The interlocking means may include an overlapping portion extending arcuately outward from one end of an arcuate unit and an underlapping portion similarly extending from an adjacent arcuate unit so that the overlapping and underlapping portions may interlockingly engage with one another during assembly.

21 Claims, 2 Drawing Figures

INTERLOCKING FRAME ASSEMBLY FOR AN ELECTRIC MOTOR STATOR

This application is a continuation, of application Ser. No. 291,467, filed Aug. 10, 1981, abandoned.

BACKGROUND OF THE INVENTION

A. Field of the Invention

The present invention relates generally to extruded frames for dynamoelectric machines and more specifically to extruded frames having a plurality of arcuate units for encasing an electric motor.

B. Description of the Prior Art

In the field of electric motor design and fabrication, frames for encasing an electric motor stator typically are designed in two overlapping hemicylindrical pieces capable of being produced by conventional extrusion techniques. During assembly of an electric motor, each piece is typically positioned, one at a time, about the wound core of an electric motor stator to form a cylindrical housing. Each piece is then held in place along the axial length of a wound stator by a specially designed clamping device. The two hemicylindrical pieces are then seam welded along an axially extending line of overlap between the two pieces to permanently affix the pieces about the stator.

One problem with two-piece frame design and assembly is that it may sometimes be very difficult to properly assemble each hemicylindrical portion of the frame about a wound core prior to welding to form a cylinder to perfectly fit the particular dimensions of an individual stator. Also, some type of clamping or holding device is always required during the preliminary assembly stage to maintain each hemicylindrical portion about the wound core.

Another problem encountered with conventional two-piece frames fabricated by extrusion techniques is that the maximum size of the frame, and thus the maximum outer diameter of the wound core, is significantly limited by the size of the extrusion die available to produce the frames. When a two-piece frame is used, the cost of extruding larger diameter frames may be prohibitively expensive.

Yet another problem encountered with conventional two-piece frames, and encountered even more frequently in one-piece frames for relatively small electric motors, is that during transportation of the frames from their fabrication to assembly locations, the risk of deformation of the arcuate structure of the frames may be undesirably high. The frames must be perfectly circular when assembled about a wound core. If the frames are undesirably deformed during transportation, it is sometimes necessary to sufficiently heat the frames to permit adjustment of the inner circumferential arc of the frame to reattain the required circularity of the frame.

SUMMARY OF THE INVENTION

The subject invention as described herein, is a frame assembly for a dynamoelectric machine. The subject frame includes at least three arcuate units for longitudinally encircling a wound core of an electric motor. The subject invention comprehends the inclusion of an interlocking means extending from at least one end of each arcuate unit for maintaining the units in position about the wound core of an electric motor as the motor is being fabricated. The interlocking means may include an overlapping portion at one end of an arcuate unit and an underlapping portion extending from an adjacent arcuate unit so that the overlapping and underlapping portions may interlockingly engage with one another during assembly to form a cylindrical housing about the stator.

An object of the subject invention is the provision of a frame assembly wherein each unit of the assembly has less than a 180° arc circumference.

Another object of the subject development is the provision of a means for temporarily maintaining portions of a frame assembly in position about a wound core prior to welding.

Yet another object of the subject invention is the provision of a relatively large frame assembly which is economical to produce and is easily transportable without deformation.

Still another object of the subject development is the provision of a means for adjustably aligning the circularity of a frame about a wound stator.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
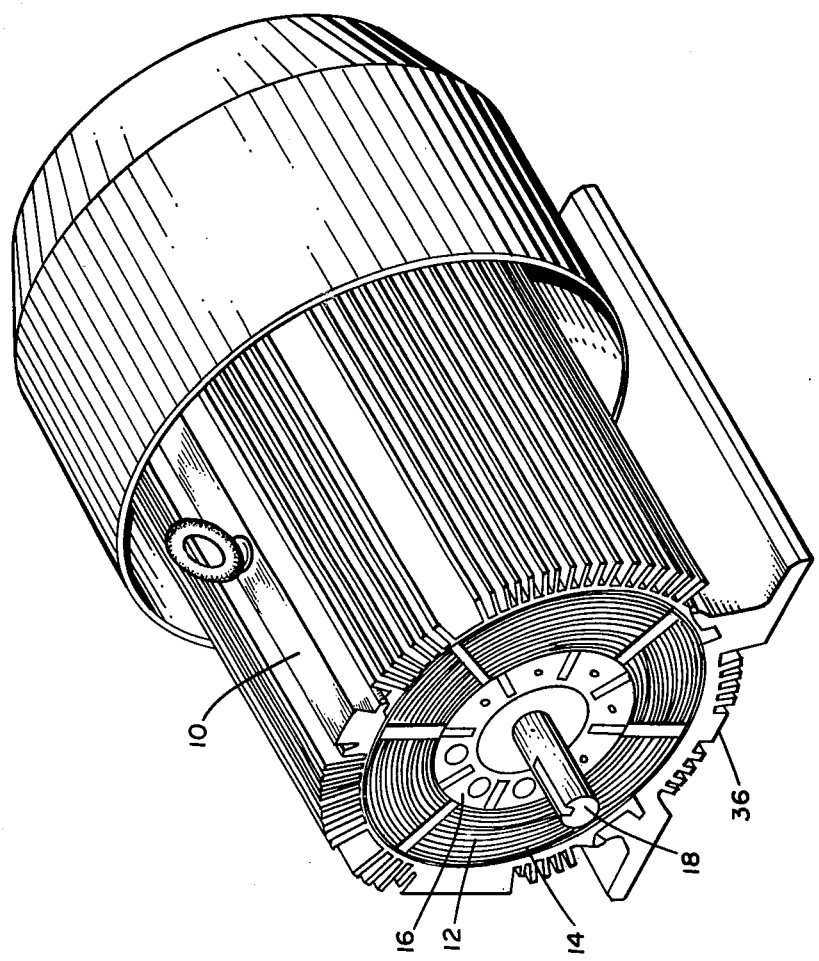
FIG. 1 is an isometric illustration of a section of an electric motor including the subject interlocking frame in the preferred embodiment.

Referring now to FIG. 1, the present invention is a generally cylindrical hollow frame 10 for encasing a wound core 12 of an electric motor stator concentrically disposed about a rotor 16 and shaft 18. The frame assembly of the subject development generally comprehends that the frame may include three or more arcuate portions 24 encircling the stator 14. The inner diameter of the generally cylindrical frame is slightly larger than the outer diameter of the wound stator to create a close-fitting relationship between the frame and the stator to maximize heat transfer from the stator to the frame. Since extrusion techniques have proven to be the simplest and most economical way to produce mass quantities of frames for electric motors, of the type illustrated in the preferred embodiment, the frame is made of a metal capable of extrusion, for example, aluminum. The subject device, however, may be produced by other techniques such as machining, casting, etc. A variety of materials may be used in producing the frame provided that the materials meet certain technical and economical requirements of the electric motor.

The subject frame is particularly advantageous in situations in which it is required to produce a frame having an outside diameter greater than 16 inches since current conventional extrusion devices are not capable of extruding two-piece frames with an outside diameter exceeding 16 inches. The subject device is useful, however, in any size diameter and is not intended to be limited to large-diameter motors.

Figure 2:
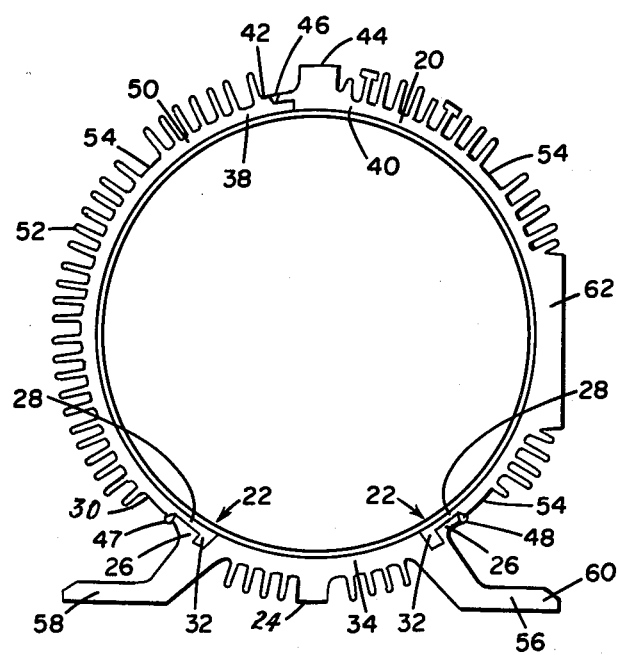
FIG. 2 is an assembled plan view of the preferred embodiment of the subject frame.

Referring now to FIG. 2 which is an assembly plan view of the preferred embodiment of the subject frame, the present invention comprehends the inclusion of interlocking means 22 for maintaining arcuate portions 20 of the frame about the stator during assembly. The means for interlockingly engaging the arcuate units may extend integrally from at least one end 24 of each arcuate unit. In the preferred embodiment, the subject invention comprehends that the interlocking means include an overlapping portion 26 extending from one end of at least one of said arcuate units 24. The preferred embodiment of the interlocking means further comprehends the inclusion of an underlapping portion 28 extending from one end of another of the arcuate units 30. Accordingly, when units 24 and 30 are assembled, the overlapping and underlapping portions, 26 and 28 respectively, are in interlocking engagement therebetween.

Although a variety of interlocking configurations are considered to be within the scope of the invention, the preferred embodiment of the subject development comprehends that the underlapping portion 28 includes a foot portion 32 which extends normally outward from the arcuate portion 28. In the preferred embodiment, the overlapping portion 26 includes an inwardly extending indention which has a configuration which is a mirror image of foot 32 for interlockingly receiving the foot. Thus, during assembly of a motor, the interlocking means will automatically hold each arcuate portion of the frame in place.

In the preferred embodiment, the subject frame is limited to three pieces. Two pieces cover the upper two-thirds of the stator and the third piece covers the underside of the stator. An overlapping indention portion 26 is provided at both ends of a lower arcuate portion 34 disposed about the underside 36 of a motor. An underlapping foot portion 32 is further provided at the end of each upper arcuate portion 38, 40 disposed adjacent to the overlapping portions 26. As will be obvious to those skilled in the art, in the preferred embodiment it is not necessary for end portions 42 and 44 of upper arcuate portions 38 and 40 to include an interlocking means. Thus, the subject frame, as described in the preferred embodiment, may be easily preassembled into the desired cylindrical form first and then slipped over a wound stator. The frame will then automatically maintain the desired encasement relationship about the stator without the use of additional expensive clamping devices. Each of the arcuate units may then be seam welded as illustrated by welds 46–48 in FIG. 2 to permanently fix the frame about the stator. It is possible, however, if desired, to apply additional pressure to the arcuate unit during the welding process to forcibly maintain the interlocking engagement relationship of each arcuate unit. It is desirable, for instance, to apply force to the arcuate units during the welding process when it is believed that either the subject frame or the wound stator is not perfectly cylindrical. It is also desirable to apply pressure to the subject frame during welding to reduce the clearance between the frame 10 and the wound core 12 of an electric motor stator. By applying pressure to the subject frame during welding, it is possible for the frame to adjust to differences in circularity between the frame and the stator since the subject frame includes three or more arcuate units. This is a major advantage of the subject frame over prior-art, conventional, two-piece frames.

Another major advantage of the subject frame is that by using three or more arcuate portions, it is possible to have the arcuate portion disposed about the underside 36 of the motor to be slightly thicker than arcuate portions disposed on about the upperside of the motor. This increased thickness enhances the stability of the motor frame.

As can be seen in FIG. 2, each arcuate unit includes a shell portion 50 having a plurality of outwardly extending thin-welding extensions 52 for heat dissipation during operation of the motor. Flats 54 may be provided between the extensions 52 to allow pressure to be applied directly to the arcuate portion 50 during the welding process.

One or more pedestals 56 may be provided which extend outwardly from an underside portion of the subject frame to support the frame. Two pedestals 56 and 58 are provided in the preferred embodiment. Each pedestal 56, 58 extends radially outward from each overlapping portion 26 of the lower arcuate unit. In the preferred embodiment, each pedestal includes a horizontally extending portion 60 on which the frame may be balanced.

An outer surface of the frame may be provided with a flat portion 62 for mounting a control device or terminal box. Flat portions 54 may also serve as a clearance gap for bolts (not shown) attached to the frame.

One advantage of the subject frame over conventional two-piece frames is that each unit of the frame assembly has less than a 180° arc circumference. This feature greatly facilitates manufacturing, handling, and transporting relatively large frames without warping or bending the frames.

Another advantage of the subject development is the provision of a means for temporarily maintaining portions of the frame assembly in position about a wound core prior to welding without the use of external clamping means.

Although the invention has been described and illustrated in detail, it is to be clearly understood that the same is by way of illustration and example only and is not to be taken by way of limitation, the spirit and scope of this invention being limited only be the terms of the appended claims.

I claim:

1. A frame assembly for a dynamoelectric machine having a wound core and adapted to be assembled in close thermal contact to said wound core comprising at least three arcuate frame units, and an interlocking means integrally formed at least at one end of each frame unit, said interlocking means providing for sliding engagement therebetween as adjacent frame units are moved longitudinally with respect to each other and fitted against the wound core, the interlocking means upon engagement having means to resist substantial relative movement of their respective frame units about the core so that the frame assembly may be easily assembled about the wound core and remain substantially self aligned as the frame units are permanently fixed in position.

2. The assembly as recited in claim 1, wherein said interlocking means includes an overlapping portion extending from one end of at least one of said arcuate units, and an underlapping portion extending from one end of another of said arcuate units adjacent to said arcuate unit having said overlapping portion whereby when said adjacent units are assembled, said overlapping and underlapping portions are in interlocking engagement therebetween.

3. The assembly as recited in claim 2, wherein said underlapping portion includes a foot extending normally outward from said arcuate portion, and said overlapping portion includes an indention on the underside thereof to receive said foot.

4. The assembly as recited in claim 2, wherein the number of arcuate units is limited to three units wherein two of said arcuate units encase an upper portion of the wound core and the third of said arcuate units encases a lower portion of said core and supports the weight of said core.

5. The assembly as recited in claim 4, wherein said supporting arcuate unit is substantially thicker than said upper arcuate units.

6. The assembly as recited in claim 5, wherein said arcuate units are relatively thin walled and equipped with a plurality of ribs extending outwardly from the outer surface of each unit.

7. The assembly as recited in claim 5, wherein said supporting unit is provided with at least one outwardly extending pedestal for resting said arcuate units of said frame thereupon.

8. The frame assembly of claim 1 wherein the adjacent ends of one pair of frame units have flanges, said flanges permitting limited relative movement therebetween to facilitate compression of the frame assembly about the core before permanent fixation thereof.

9. A frame assembly for encasing a dynamoelectric machine having a generally cylindrical wound core and adapted to be assembled and permanently fixed in close thermal contact to said cylindrical wound core comprising three arcuate frame units, each of which extend less than 180° around the circumference of the core, one of said frame units having an interlocking means integrally formed along both ends thereof, each of the second two frame units having an interlocking means formed along only one end thereof and a flange formed along the other end thereof, said interlocking means having means to engage as adjacent frame units are slid longitudinally with respect to each other as they are fitted against the wound core, upon assembly said first frame units and the flanged ends of the second two rame units matching and lining up for relative sliding movement therebetween to facilitate compression of the frame assembly about the core before welding along the interlocking means and flanges to permanently fix the frame assembly about the core.

10. The frame as recited in claim 9, wherein said interlocking means includes overlapping portions extending from at least two of said sides and underlapping portions extending from at least two other of said sides in juxtaposition with said sides having said overlapping portions.

11. The frame as recited in claim 10, wherein said underlapping portion includes a foot extending normally outward from said arcuate portion, and said overlapping portion includes an indention on the underside thereof to receive said foot.

12. The assembly as recited in claim 11, wherein two of said arcuate units encase an upper portion of said wound core and the third of said arcuate units encases a lower portion of said core and supports the weight of said core.

13. The assembly as recited in claim 12, wherein said supporting arcuate unit is substantially thicker than said upper arcuate units.

14. The assembly as recited in claim 13, wherein said upper arcuate units are equipped with a plurality of ribs extending outwardly from the outer surface of each unit.

15. The assembly as recited in claim 14, wherein said lower arcuate unit is provided with at least one outwardly extending pedestal for resting said arcuate units of said frame thereupon.

16. A frame assembly for a dynamoelectric machine having a wound core and adapted to be assembled in close thermal contact to said wound core comprising at least three arcute frame units, and an interlocking means integrally formed at least at one end of each frame unit, said interlocking means including a foot extending normally outward at least at one end of at least one of said arcuate units, and an indentation on the underside of another said arcute units adjacent to said end of said arcuate unit having said foot whereby when said adjacent units are assembled, said foot and indentation are in interlocking engagement therebetween, said interlocking means providing for sliding engagement therebetween as adjacent frame units are moved longitudinally with respect to each other and fitted against the wound core, the interlocking means upon engagement resisting substantial relative movement of their respective frame units about the core so that the frame assembly may be easily assembled about the wound core and remain substantially self aligned as the frame units are permanently fixed in position.

17. A frame assembly for encasing a dynamoelectric machine having a generally cylindrical wound core and adapted to be assembled and permanently fixed in close thermal contact to said cylindrical wound core comprising three arcuate frame units, each of which extend less than 180° around the circumference of the core, a first one of said frame units having an interlocking means integrally formed along both ends thereof, each of the second and third frame units having an interlocking means formed along only one end thereof and a flange formed along the other end thereof, said interlocking means including a foot extending normally outward from one end of at least two of said frame units and an indentation on the underside of at least two other of said ends, each of said indentations being in juxtaposition with each of said feet, said interlocking means providing for sliding engagement between said feet and said indentation as adjacent frame units are moved longitudinally with respect to each other and fitted against the wound core, upon assembly said first frame unit being thereby interlocked between said second and third frame units and the flanged ends of the second and third frame units matching and lining up for relative sliding movement therebetween to facilitate compression of the frame assembly about the core before welding along the interlocking means and flanges to permanently fix the frame assembly around the core.

18. The assembly as recited in claim 17 wherein two of said arcuate units encase an upper portion of said wound core and the third of said arcuate units encases a lower portion of said core and supports the weight of said core.

19. The assembly as recited in claim 18 wherein said supporting arcute unit is substantially thicker than said upper arcuate units.

20. The assembly as recited in claim 19 wherein said upper arcuate units are equipped with a plurality of ribs extending outwardly from the outer surface of each unit.

21. The assembly as recited in claim 20 wherein said lower arcute unit is provided with at least one outwardly extending pedestal for resting said arcuate units of said frame thereupon.

* * * * *